April 4, 1961

R. L. FILLMORE 2,977,765

SERVO MOTOR CONTROL APPARATUS

Filed Dec. 23, 1959

INVENTOR.
ROBERT L. FILLMORE
BY Joseph E. Ryan
ATTORNEY

United States Patent Office 2,977,765
Patented Apr. 4, 1961

2,977,765
SERVO MOTOR CONTROL APPARATUS

Robert L. Fillmore, Mound, Minn., assignor to Minneapolis-Honeywell Regulator Company, Minneapolis, Minn., a corporation of Delaware Filed Dec. 23, 1959, Ser. No. 861,668

10 Claims. (Cl. 60—52)

My invention relates to servo motor control apparatus and more particularly to an improved positioning and speed control of a servo motor.

Figure 1:
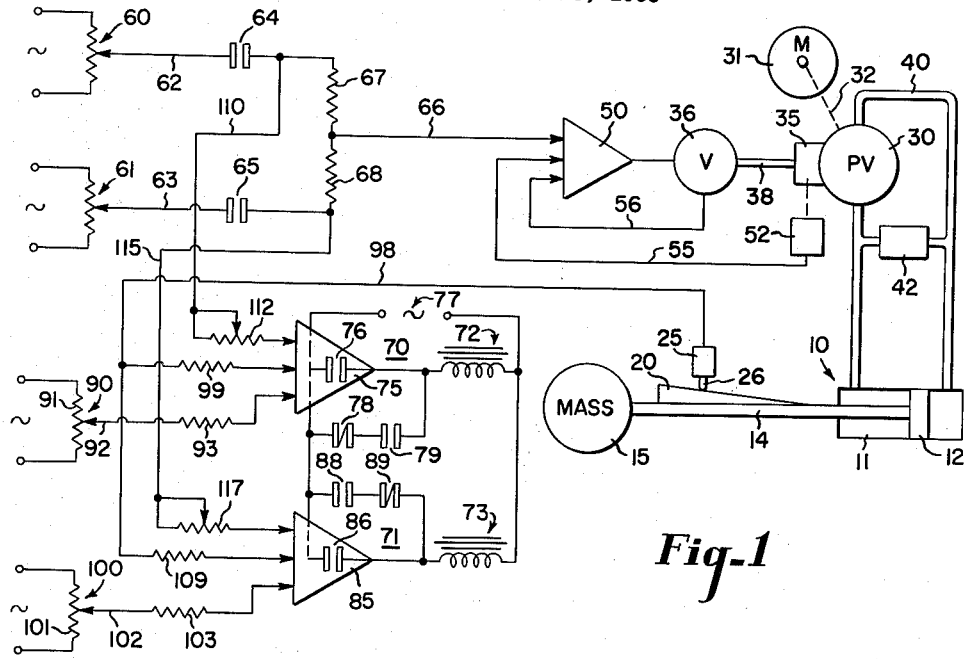
Figure 2:
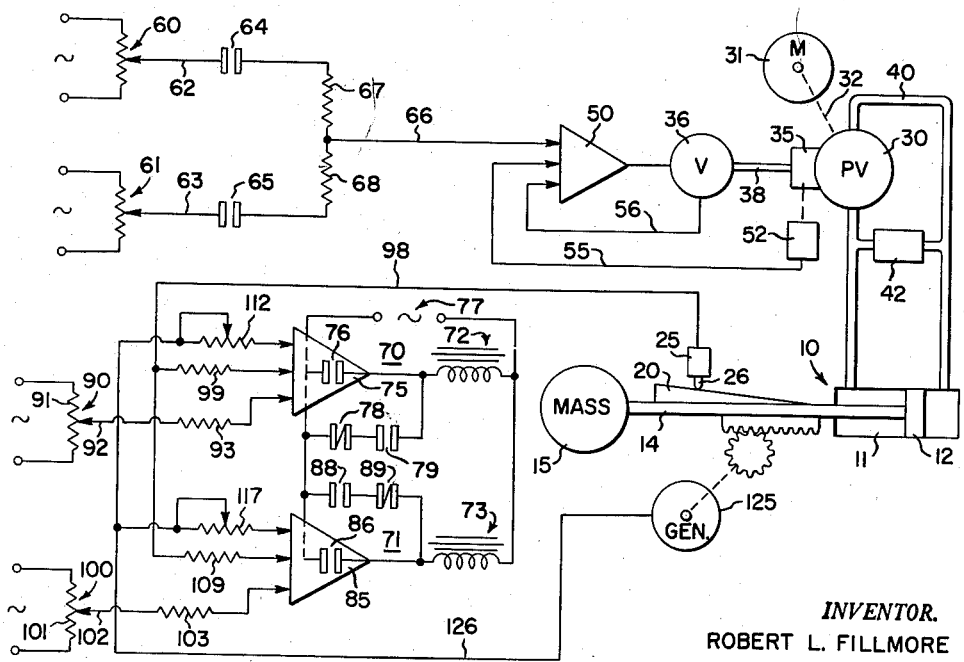

The control of servo motors of the electric, pneumatic or hydraulic type with regard to speed of operation, position of operation, reversing, acceleration and deceleration are all well recognized in the prior art. In some instances, one or more control functions or responses are effected on the same motor unit, but in these instances the individual control effect is produced by separate control circuits or unrelated control components. The present invention is directed toward a switching and positioning control for a servo motor and is specifically applied to an electrohydraulic servo motor unit in which the speed of the servo motor is maintained at differing and desired levels for varying directions of operation, and switching is effected at accurately determined positions to reverse the operation of the motor. This type of control circuit has particular application in connection with hydraulic presses, rolling machines, planers, and other metal and wood working apparatus. The improved control apparatus controls the speed of the electrohydraulic motor, allowing for separate speed setting controllers to control speed in the varying directions of operation, and utilizes a positioning and switching control which cooperates with speed controllers to effect desired switching for varying speed settings to reverse the direction of operation of the motor. The two control circuits are interrelated to effect a modification of the switching and positioning control in accordance with the speed of operation of the motor to compensate for the inertia effects on the motor and load and thereby effect accurate reversing or positioning. It is therefore an object of this invention to provide an improved control apparatus for a servo motor in which speed, switching and positioning are controlled and in which the positioning control is modified in accordance with speed of operation of the servo motor. A further object of this invention is to provide in a control apparatus of this type an improved reversing servo motor control wherein speed and hence momentum of the load modifies the switch-over point. These and other objects of this invention become apparent from a reading of the attached description together with drawings wherein:

Figure 1 is a schematic drawing of the improved switching and positioning control apparatus and, Figure 2 is a schematic drawing of a second embodiment of the invention.

In Figure 1, my improved control apparatus is shown applied to a servo motor, in which the motor actuator is shown schematically as a ram at 10 having a cylinder portion 11 and a piston 12 to which is attached an operating shaft 14 positioning a mass indicated schematically at 15. Associated with the shaft or motor is a cam 20 which is contoured or surfaced to provide an indication of travel of the ram or motor. The cam 20 has associated therewith a signal transducer 25 having a follower 26 in contact with a cam to provide an electrical signal output in proportion to position of the servo motor, for purposes which will be later noted. The ram or hydraulic motor is controlled by a variable displacement pump indicated schematically at 30, the pump being driven by an electric motor 31 through a mechanical connection indicated schematically at 32. The pump is of the variable displacement type in which stroke length is in turn controlled by a slide block, such as indicated schematically at 35, the slide block in turn being controlled hydraulically from a servo valve 36 through a hydraulic connection indicated schematically at 38. The variable displacement pump is connected to the opposite extremities of the ram or actuator through a conduit 40 to provide for reversible flow to either extremity of the actuator to control the speed and direction of movement of the same. A relief valve 42 is shown connected across the pump for conventional purposes.

Servo valve 36, which controls the position of the slide block of the variable displacement pump to effect variable output of the pump and hence speed of the hydraulic motor, is of the electrohydraulic type and is controlled from an amplifier 50. The electrical output of amplifier 50 is controlled from a setting signal and a pair of feedback signals. Thus, as is indicated in the drawing, the slide block on the pump includes an electrical signal transducer 52 indicative of slide block position which is connected in a feedback circuit, indicated schematically at 55, to the amplifier 50. The servo valve also includes an electrical signal transducer indicative of valve position (not shown) connected in a feedback loop or circuit 56 to the input of the amplifier 50. Speed setting signals providing the primary input to the amplifier originate from a pair of adjustable potentiometers indicated at 60, 61, the windings of which are each connected across an energizing source. Potentiometers 60, 61 include wipers 62, 63 respectively which are connected in circuit through switching contacts 64, 65 of relays 73, 72 respectively, which will be later identified in detail. The circuits from contacts 64, 65 lead to summing resistors 67, 68 and an electrical circuit 66 which is connected to amplifier 50. Depending upon which of the contacts 65 or 64 is closed, the respective potentiometer will feed a signal through the respective summing resistor 67 or 68 to the input of the amplifier 50 where a signal will be summed with the feedback signals from the circuits 55, 56 from the servo valve and pump to provide a combined input signal to the amplifier controlling the electrohydraulic servo valve which in turn controls the variable displacement pump to provide a varying hydraulic output to the motor and the control of speed of the same. With this circuit arrangement, selection of speed for each direction of operation may be obtained and readily adjusted. Further the sense of the input signals from the setting devices 60, 61 will determine the direction of operation of the electrohydraulic servo motor.

While the disclosure herein is directed to an electrohydraulic motor with the varying feedback loops in the control of speed of the servo motor, it will be recognized that other types of servo motors, such as electric motors, may be utilized.

Switching and positioning of the servo motor is obtained through a second circuit or network which includes a pair of electronic relays indicated generally at 70, 71 having relay coils 72, 73 respectively associated with the contacts 64, 65 respectively. These relays are electrically interlocked and are controlled in accordance with desired position compared with actual position of the servo motor and modified by the speed of operation of the servo motor, as will be later noted. Relay 70 includes an amplifier 75 which is energized from an alternating current source indicated at 77 and which includes an internal electrical contact or valve 76 connecting the coil 72 across the alternating current source for energization purposes. In addition the amplifier has a parallel shunt circuit associated therewith including a normally closed contact 78 of the relay coil 73 and a normally open contact 79 of the relay coil 72 to provide a conventional electrical interlock and holding circuit. Similarly the relay 71 including the coil 73 has associated therewith an amplifier 85 having an internal contact or valve 86 adapted to connect the coil 73 across the energizing source 77 with normally open holding contacts 88 for the coils 73 and normally closed contact 89 for the relay coil 72 connected in parallel therewith in a conventional interlock and holding circuit. Thus, depending upon the energization of the respective amplifiers, one or the other of the relay coils 72, 73 will be energized to close respectively one or the other of the contacts 65, 64 associated with the primary speed setting and direction adjusting potentiometers or controllers 60, 61 connecting the same to the amplifier 50 to control the speed and direction of the servo motor. The amplifier 75 of relay 70 includes an input signal from a position setting device 90 having a potentiometer winding 91 with a wiper 92 associated therewith, the wiper being connected through a summing resistor 93 to the input of the amplifier. In addition, amplifier 75 receives an electrical signal output from the signal transducer 25 through a conductor or circuit 98 connected to a summing resistor 99 providing a second input to the amplifier 75. Similarly amplifier 85 has associated therewith a position setting or adjusting means 100 including a potentiometer winding 101 and a wiper 102 connected to a summing resistor 103 leading to the amplifier and receiving a feedback signal from the conductor 98 and transducer 25 through a summing resistor 109 connected to the input of the amplifier. In addition to the above signals for effecting reversing or switching and position limiting on the operation of the servo motor, a modifying signal in the form of either the desired or actual speed of the servo motor is provided. Thus the conductor 110 leading from the summing resistor side of the contact 64 associated with speed setting controller 60 is connected through an adjustable summing resistor 112 to the input of amplifier 75 and a conductor 115 connected to the signal output from the speed controller 61 at the summing resistor 68 is connected through an adjustable summing resistor 117 to the input of amplifier 85. Therefore the respective amplifiers 75, 85 of relays 70, 71 receive input signals is accordance with desired position of switching, actual position of the servo motor, and a modifying signal in accordance with the speed of operation of the servo motor. These will be of such sense and in such direction as to anticipate or perform the switching prior to the time that the actual desired limit position is reached to compensate for the effect of momentum and mass on the servo motor and load such that accurate reversal of operation of the servo motor will be obtained.

In the embodiments shown in Figure 2 the hydraulic motor includes in addition to the position feedback transducer, a tachometer or speed generator indicated at 125 which is connected through a circuit 126 to the input of the amplifier 70, 71 in place of the circuits leading from the speed setting controllers or potentiometers 60, 61. Thus circuit 126 is connected to the respective summing resistors 112, 117 to the input of amplifiers 75, 85 to provide an actual velocity signal which because of the direction of operation of the servo motor will be of varying sense and magnitude to provide an input signal in accordance with actual speed of operation of the servo motor for modification of the switching circuit.

Since the remaining portion of the control apparatus including the electrohydraulic servo motor, the speed setting and control portion of the servo motor are identical with the disclosure of Figure 1, discussion of the same is omitted here for simplicity. Further, the switching and positioning control portion of the apparatus maintains the same input signals from the standpoint of setting and position feedback and these details are omitted here for simplicity.

In operation, the improved switching and positioning control apparatus provides, in addition to speed controls, an accurate reversal of the servo motor. The speed controllers, which are connected through the reversing or switching portion of the apparatus, control in a conventional manner the speed of the servo motor, and the position of reversal or switching is controlled from setting devices compared with actual position of the motor to operate switching relays which are electrically interlocked. The operation of the relays, however, is modified by the introduction of the speed signal of such sense as to offset the effect of momentum and mass in the operation of the hydraulic motor to effect actual switching at the desired switch-over points.

In considering this invention it should be considered that the present disclosure is illustrative only and the scope of the invention should be determined only by the appended claims.

I claim as my invention:

1. A servo control system comprising, a servo motor, means for controllably energizing said servo motor to control the speed of the same, a forward and reverse speed setting means, connection means connecting said speed setting means to said energizing means for control of said servo motor, switching means included in said connection means for selectively connecting one or the other of said speed setting means to said energizing means, first and second control circuit means including relay means connected to operate selectively said switching means, limit position setting means for defining travel limits of said servo motor connected to and controlling respectively said first and second control circuit means, signalling means indicative of the actual position of said servo motor connected in a feeback circuit to said first and second control circuit means, and further circuit means connecting said forward and reverse speed setting means to said first and second control circuit means.

2. A servo control system comprising, a servo motor, means for controllably energizing said servo motor to control the speed of the same, a forward and reverse speed setting means, connection means connecting said speed setting means to said energizing means for control of said servo motor, switching means included in said connection means for selectively connecting one or the other of said speed setting means to said energizing means, first and second control circuit means including relay means connected to operate selectively said switching means, limit position setting means for defining travel limits of said servo motor connected to and controlling respectively said first and second control circuit means, signalling means indicative of the actual position of said servo motor connected in a feedback circuit to said first and second control circuit means, and means indicative of actual speed of operation of said servo motor connected to said first and second control circuit means for modifying the operation of said control circuit means on said switching means.

3. An electrohydraulic servo speed control system comprising, a hydraulic motor, means for controlling the speed of said motor including a motor driven variable displacement pump and a servo valve connected to said pump to vary the displacement on the same, fluid connection means connecting said pump to said motor to variably energize said motor and the control of speed thereof, amplifier means connected to said servo valve to control the operation of said servo valve and including feedback circuits from said servo valve and the variable displacement pump to stabilize the operation of said valve, a speed setting circuit means including a pair of electrical signal producing devices operative to set the forward and reverse speed of operation of said valve, means connecting said speed setting devices to said amplifier means to control the operation of said valve, switching means included in said last named circuit means for selectively connecting one or the other of said speed setting means to said amplifier means, first and second control circuit means including relay means connected to operate selectively said switching means, limit position setting means included in said first and second control circuit means respectively for defining limited travel of said hydraulic motor, signalling means connected in part to said hydraulic motor and operative to indicate the actual position of operation of said hydraulic motor, further circuit means connecting said signalling means to said first and second control circuit means to apply a position feedback signal to said first and second control circuit means, and a modifying circuit means connecting said forward and reverse speed setting signal producing devices to said first and second control circuit means respectively.

4. An electrohydraulic servo speed control system comprising, a hydraulic motor, means for controlling the speed of said motor including a motor driven variable displacement pump and a servo valve connected to said pump to vary the displacement on the same, fluid connection means connecting said pump to said motor to variably energize said motor and the control of speed thereof, amplifier means connected to said servo valve to control the operation of said servo valve and including feedback circuits from said servo valve and the variable displacement pump to stabilize the operation of said valve, a speed setting circuit means including a pair of electrical signal producing devices operative to set the forward and reverse speed of operation of said valve, means connecting said speed setting devices to said amplifier means to control the operation of said valve, switching means included in said last named circuit means for selectively connecting one or the other of said speed setting devices to said amplifier means, first and second control circuit means each including amplifier and relay means, said relay means being connected to operate said switching means which selectively connect said speed setting signal producing devices to said amplifier means, an electrical signal producing means associated with said hydraulic motor and adapted to produce a signal indicative of the position of travel of said hydraulic motor, limit position setting potentiometer means connected respectively to said amplifiers in said first and second control circuit means to determine the operation of said relay means, circuit means connecting said signal producing means associated with said hydraulic motor to each of said amplifier means in said first and second control circuit means, and modifying circuit means connecting said speed setting signal producing devices to said amplifiers in said first and second control circuit means.

5. An electrohydraulic servo speed control system comprising, a hydraulic motor, means for controlling the speed of said motor including a motor driven variable displacement pump and a servo valve connected to said pump to vary the displacement on the same, fluid connection means connecting said pump to said motor to variably energize said motor and the control of speed thereof, amplifier means connected to said servo valve to control the operation of said servo valve and including feedback circuits from said servo valve and the variable displacement pump to stabilize the operation of said valve, a speed setting circuit means including a pair of electrical signal producing devices operative to set the forward and reverse speed of operation of said valve, means connecting said speed setting devices to said amplifier means to control the operation of said valve, switching means included in said last named circuit means for selectively connecting one or the other of said speed setting signal producing devices to said amplifier means, first and second control circuit means each including amplifier and relay means, said relay means being connected to operate said switching means which selectively connect said speed setting signal producing devices to said amplifier means, an electrical signal producing means associated with said hydraulic motor and adapted to produce a signal indicative of the position of travel of said hydraulic motor, limit position setting potentiometer means connected respectively to said amplifiers in said first and second control circuit means to determine the operation of said relay means, circuit means connecting said signal producing means associated with said hydraulic motor to each of said amplifier means in said first and second control circuit means, and additional circuit means controlled by said switching means and connected to the amplifiers of first and second control circuit means to provide an additional setting signal to said respective amplifiers indicative of the speed of operation of the hydraulic motor means.

6. A servo control system comprising, a servo motor, means for controllably energizing said servo motor to control the speed of the same, a forward and reverse speed setting means, connection means connecting said speed setting means to said energizing means for control of said servo motor, switching means included in said connection means for selectively connecting one or the other of said speed setting means to said energizing means, first and second control circuit means including relay means connected to operate selectively said switching means, limit position setting means for defining travel limits of said servo motor connected to and controlling respectively said first and second control circuit means, signalling means indicative of the actual position of said servo motor connected in a feedback circuit to said first and second control circuit means, said signalling means including a cam and cam follower connected respectively in part to said device to be operated and a stationary part and providing relative movement to operate a signal transducer in accordance with the position of operation of said motor, and further circuit means connecting said forward and reverse speed setting means to said first and second control circuit means.

7. In combination, a servo motor, means for controlling the speed of operation of said servo motor, a speed control circuit including forward and reverse speed setting means selectively operable to control the speed of operation of said motor, a position control circuit means including position reversing setting means and means indicative of the position of operation of said servo motor electrically associated with said speed control circuit means to selectively operate said forward or reverse speed setting means, and further circuit means connected to said positional control means and responsive to the speed of operation of said motor for modifying the operation of said positional control means.

8. In combination with a servo motor, a first circuit means including an energization means for said servo motor and means to control speed of said servo motor, adjustable means included in said first circuit means to determine the speed of operation of said servo motor in two directions of operation, switching means included in said circuit to selectively determine one or the other direction of operation, second circuit means including a pair of relays to operate said switching means, position setting and position feedback means included in said second circuit to affect positional control of said servo motor to operate said switching means, and additional circuit means including means providing a signal indicative of the desired speed of operation of said motor connected to and modifying the operation of said relay to affect switching in accordance with the speed and position of said servo motor.

9. In combination with a servo motor, a first circuit means including an energization means for said servo motor and means to control speed of said servo motor, adjustable means included in said first circuit means to determine the speed of operation of said servo motor in two directions of operation, switching means included in said circuit to selectively determine one or the other direction of operation, second circuit means including a pair of relays to operate said switching means, position setting and position feedback means included in said second circuit to affect positional control of said servo motor to operate said switching means, and additional circuit means including means providing a signal proportional to speed of operation of said servo motor connected to said relays to modify the effect of said setting and feedback means on the control of said relays.

10. In combination, a servo motor, means for controlling the speed of operation of said servo motor, a speed control circuit including forward and reverse speed setting means selectively operable to control the speed of operation of said motor, a position control circuit means including position reversing setting means and means indicative of the position of operation of said servo motor electrically associated with said speed control circuit means to selectively operate said forward or reverse speed setting means, and further circuit means connected to said positional control means and providing a signal proportional to the speed of operation of said motor for modifying the operation of said positional control means.

References Cited in the file of this patent

UNITED STATES PATENTS

| | | |
|---|---|---|
| 2,536,876 | Dannatt | Jan. 2, 1951 |
| 2,871,660 | McDonald et al. | Feb. 3, 1959 |